United States Patent [19]

Bloome et al.

[11] Patent Number: 4,570,278
[45] Date of Patent: Feb. 18, 1986

[54] PORTABLE POLISHER AND BUFFS THEREFOR

[75] Inventors: James A. Bloome, Blue Grass; Rick A. Meeker, Davenport; Jerry T. Whicker, Bettendorf, all of Iowa; Frederick J. Foreman, Pittsburgh, Pa.

[73] Assignee: The Kartridg Pak Co., Davenport, Iowa

[21] Appl. No.: 631,625

[22] Filed: Jul. 17, 1984

Related U.S. Application Data

[63] Continuation-in-part of Ser. No. 469,756, Feb. 25, 1983, Pat. No. 4,499,624.

[51] Int. Cl.$^4$ .................. B64F 5/00; A47L 11/03
[52] U.S. Cl. ........................ 15/97 R; 15/50 C; 15/98; 15/230; 15/230.14
[58] Field of Search .............. 15/230, 230.11, 230.12, 15/230.13, 230.14, 230.15, 230.16, 230.17, 230.19, 23, 24, 49 C, 50 C, 52, 97 R, 98

[56] References Cited

U.S. PATENT DOCUMENTS

| | | | |
|---|---|---|---|
| 188,670 | 3/1877 | Poole | 15/230.19 |
| 616,184 | 12/1898 | Demmler | 15/230.19 |
| 684,203 | 10/1901 | Eaton | 15/230.14 |
| 1,061,843 | 5/1913 | Howarth . | |
| 1,846,163 | 2/1932 | Traver | 15/230 X |
| 1,849,218 | 3/1932 | Beach | 15/49 C |
| 2,060,952 | 11/1936 | Springer | 15/230.12 |
| 2,120,252 | 6/1938 | Kadri . | |
| 2,186,397 | 1/1940 | Vickery . | |
| 2,354,307 | 7/1944 | Emery . | |
| 2,642,599 | 6/1953 | Habian | 15/24 |
| 2,749,599 | 6/1956 | Kreger | 15/230.11 X |
| 2,842,788 | 7/1958 | Rench et al. | 15/49 C X |
| 3,172,138 | 3/1965 | Price | 15/23 X |
| 3,217,646 | 11/1965 | Sharkey | 15/230 X |
| 3,395,495 | 8/1968 | Powanda . | |
| 3,619,948 | 11/1971 | Burns . | |
| 3,631,558 | 1/1972 | Kovacevic | 15/50 C |
| 4,302,122 | 11/1981 | Moya | 15/50 C |
| 4,328,645 | 5/1982 | Sauer . | |

FOREIGN PATENT DOCUMENTS

| | | | |
|---|---|---|---|
| 846333 | 8/1952 | Fed. Rep. of Germany | 15/49 C |
| 69660 | 6/1916 | Norway . | |
| 193300 | 12/1937 | Switzerland | 15/24 |

*Primary Examiner*—Edward L. Roberts
*Attorney, Agent, or Firm*—Lockwood, Alex, Fitzgibbon & Cummings

[57] ABSTRACT

Portable polishers and buffs are provided for surface preparation or for surface repair of substrates such as sheet aluminum. The polisher and buffs are particularly well suited for restoring the polished finish of aluminum aircraft skin that has been dulled by normal use and to repair blemishes on polished aluminum that occur during handling and fabrication. Elongated polishing rolls or buffs counter-rotate such that one polishing buff rotates in a clockwise direction about its elongated axis and another polishing buff rotates in a counterclockwise direction about its elongated axis. The buffs, which include a plurality of fabric disks that are axially compacted and secured onto a disposable sleeve, provide a buff having substantially enhanced polishing attributes. A universal mount assembly is also provided to facilitate use of the portable polisher in combination with a power-assisted lift assembly.

30 Claims, 14 Drawing Figures

PORTABLE POLISHER AND BUFFS THEREFOR

This application is a continuation-in-part of application Ser. No. 469,756, filed on Feb. 25, 1983, now U.S. Pat. No. 4,499,624 the disclosure thereof being incorporated by reference hereinto.

BACKGROUND AND DESCRIPTION OF THE INVENTION

This invention generally relates to polishing devices, more particularly to hand-operable or portable devices that are suitable for restoring the surface finish to substrates that have an extensive surface area. The portable polisher according to this invention includes a pair of polishing rolls or buffs that are securely mounted onto a respective pair of elongated arbors that rotate along their respective longitudinal axes in a counter-rotating manner by the operation of a drive assembly that rotates one arbor in a clockwise direction and the other arbor in a counterclockwise direction. Buffs according to this invention, which are for mounting over the respective arbors, include a plurality of disposable fabric disks that are axially compacted together.

In industries such as aircraft maintenance and sheet metal working, it is often necessary to improve the surface characteristics and to enhance the surface appearance of substrates such as metal sheets, particularly sheet aluminum. In this regard, the aircraft industry demands specialty aluminum sheeting for fabrication over aircraft framing to thereby construct the outer skin of aircraft. This specialty sheeting and the constructed aircraft skin should be free of blemishes, corrosion and oxidation. While it is possible to paint or otherwise coat these types of surfaces, an unpainted, highly polished aluminum skin is more corrosion-resistant than a painted aluminum surface, which must also be periodically stripped and repainted, requiring toxic chemicals and expensive special facilities. Moreover, a polished aircraft skin enhances the economical operation of an aircraft because it is lighter in weight and exhibits less drag than a painted aluminum surface.

Because of these advantages, it is desirable to utilize polished aluminum sheeting to fabricate aircraft skin. However, this desirable approach does have certain disadvantages in that any blemishes thereon cannot be simply covered up, as would be the case for a painted surface. This requires high surface quality standards during the manufacture of such aluminum sheeting, as well as special care during subsequent handling thereof including shipment, storage, skin construction, and in-use maintenance. When this type of sheeting is made at the mill, it is subjected to a very high speed in-line polishing operation which imparts a highly polished surface to mill-sized webs of sheet aluminum. Such large in-line polishers are very effective in imparting the needed finish to these specialty products. However, immediately after these specialty sheets are manufactured, they are susceptible to being scratched, discolored or otherwise blemished by handling and transport devices, by the environment, and by human handling, particularly during operations such as fabricating the sheeting into the aircraft skin.

Accordingly, there is a need for a means by which surface blemishes can be repaired or removed after such highly polished specialty sheets are prepared at the mill. Certain attempts have been made in this regard by providing portable polishing units which are intended to achieve spot polishing of these blemishes. Typically, these portable polishing units impart a rotary sweep to a relatively flat buffing disk which is usually spindle-mounted.

Such units have proven less than satisfactory when compared with the results attained by large in-line polishers used at a specialty mill. Units of this type do not achieve the uniform surface finish characteristics of a finish applied at the mill. They tend to leave an uneven finish within which buffing marks are visible. Additionally, these devices, although portable, can be difficult to control because of their tendency to "walk" along the surface. Furthermore, since these specialty sheetings are exceptionally thin and pure, portable polishing units, which typically do not provide the precision polishing of the in-line apparatus used at the mill, run the risk of actually removing the thin, pure aluminum surface that is characteristic of this sheeting. In addition, previously known portable polishing units and buffs typically do not attain mill-like polished characteristics, or such characteristics are attained only after the expenditure of considerable time and effort and usually require a worker who has achieved considerable polishing skills.

Therefore, there is a need for a portable polishing apparatus which is easily controlled by a single operator, that can impart a mill-like finish with minimal risk of damaging the surface of specialty sheeting such as highly polished aluminum, and that can attain such a finish in a relatively short length of time and without requiring an exceptionally skilled operator.

Such is accomplished according to the present invention by providing a portable polishing apparatus having a pair of elongated rotatable buffs, each of which rotates along its longitudinal axis. Each such longitudinal axis is generally parallel to the surface being polished, and the pairs of buffs counter-rotate with respect to each other, one of the buffs rotating in a clockwise direction, another rotating in the counterclockwise direction, these buffs including a plurality of fabric disks that are axially compacted together. Polishing of structures such as the undersurface of aircraft can be facilitated by including a universal mount assembly that combines the portable polisher with a power-assisted lift assembly.

Accordingly, general objects of the present invention include providing an improved portable polisher and specialty buffs and mount assemblies therefor.

Another object of this invention is to provide compactly assembled buffs that are especially suitable for an improved, lightweight polisher having a pair of elongated counter-rotating buffs which are generally parallel to the surface being polished.

Another object of the present invention is to provide improved buffs for a portable polisher, which buffs minimize the polishing time and skill needed to meet commercial scale polishing requirements during fabrication and maintenance of sheet metal equipment such as aircraft bodies.

Another object of the present invention is to provide an improved portable apparatus and buffs therefor for surface repair or surface preparation of a variety of substrates.

Another object of this invention is to provide an improved portable device and buffs therefor for restoring the polished finish of aluminum aircraft skin after it has been dulled by normal use.

Another object of the present invention is to provide an improved portable device and buffs therefor for repairing blemishes on polished aluminum sheeting that occurs during handling, transport, and fabrication.

Another object of this invention is a portable polisher and buffs therefor for removing oxidation or other blemishes quickly and efficiently without substantial removal of thin, pure aluminum surfaces.

Another object of the present invention is to provide means and method for conveniently applying polishing compounds during the operation of a polishing device having counter-rotating longitudinal compactly assembled buffers.

Another object of this invention is to provide an improved longitudinal buff and method of making same, which buff resists flattening thereof and resultant drag on the surface being polished, thereby increasing surface speed at a given, constant power input to produce improved polishing action.

Another object of the present invention is to provide an improved elongated fabric buff, which is structured to increase the extent that the dressed or cut fabric edges are in contact with the surface being polished and to decrease the extent of contact between fabric sides and the surface being polished, which increases the efficiency with which the buff brightens and polishes the surface.

Another object of this invention is to provide buffs that allow for minimal fabric removal to satisfactorily dress the buffs after they have been in use, particularly when the buffs are provided with end chamfers.

Another object of the present invention is to provide an improved portable polisher having a handle assembly that facilitates remote operation thereof, as well as improved buffs therefor.

Another object of this invention is to provide an improved polisher adapted to be vertically supported by a power-assisted lift assembly for polishing structures such as the undersurface of aircraft.

These and other objects, features and advantages of the present invention will be clearly understood through consideration of the following description, including the accompanying drawings wherein:

Figure 1:
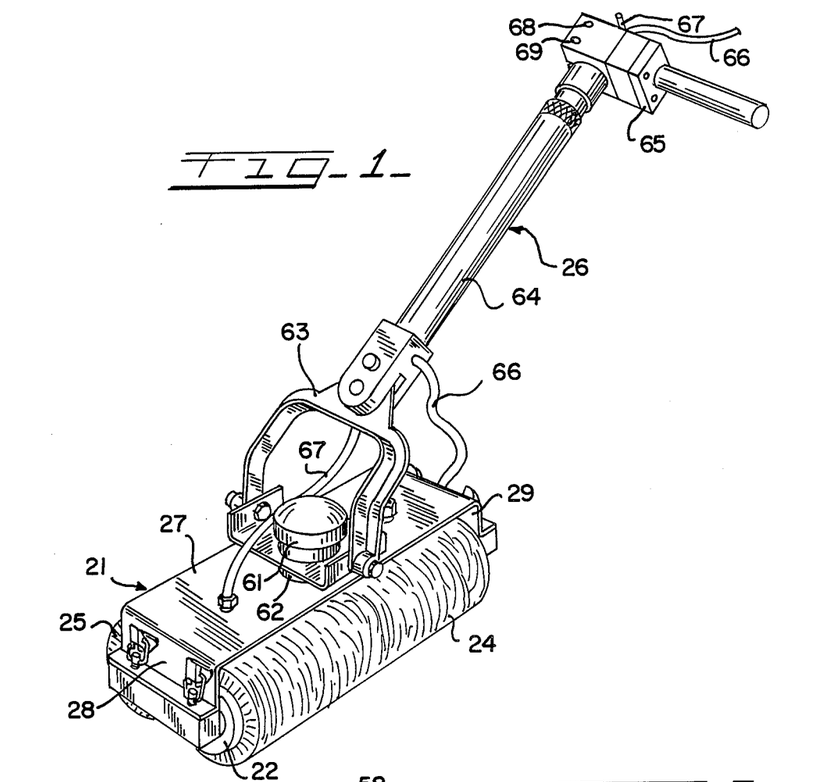
FIG. 1 is a perspective view of the portable polisher according to the present invention having one type of remote control handle assembly.

With reference to FIG. 1, the portable polisher includes a frame and cover assembly, generally designated as 21, two elongated drive arbors 22, 23 and elongated polishing rolls or buff assemblies 24, 25, which are generally cylindrically shaped and mounted onto the elongated arbors 22, 23. An appropriate motor 31 (FIG. 2) and a drive assembly in association therewith drive the elongated drive arbors 22, 23 and the elongated polishing rolls or buff assemblies 24, 25 mounted thereon in a counter-rotating manner with respect to each other.

Also illustrated in this embodiment is a remote handle assembly, generally designated as 26. Frame and cover assembly 21 includes an elongated panel 27 and legs 28, 29 depending therefrom and between which are mounted the elongated drive arbors 22, 23. The frame and cover assembly 21 also may serve as a manifold for fluids such as air to power motors 31, and it is a protective guard for the operator while protruding minimally to expose a large surface area of the polishing rolls or buff assemblies 24, 25 and permit close operation in corners and tight spots.

With more particular reference to the remote handle assembly 26, a threaded knob 61 attaches the handle assembly 26 to the frame and cover assembly 21. Control of the device is facilitated by providing an attachment member 62, whereby the handle assembly 26 may be securely oriented in a variety of directions, such as the orientation illustrated in FIG. 1 which is generally parallel to the longitudinal axis of the polishing rolls or buff assemblies 24, 25, or transverse thereto, or the like. A yoke assembly 63 facilitates attachment of the remote handle assembly 26 to the frame and cover assembly 21 in a manner that provides advantageous operator control over movement of the device. Assembly 26 includes a handle shaft 64, which may include multiple extensions to provide telescoping thereof and increase the distance of remote operation by a handle member 65 containing suitable throttle control 68 and spray nozzle control 69. In the illustrated embodiment, air supply conduit 66 and polishing compound conduit 67 are routed through or onto the handle shaft 64 and the handle member 65 to appropriate remote supplies.

Figure 2:
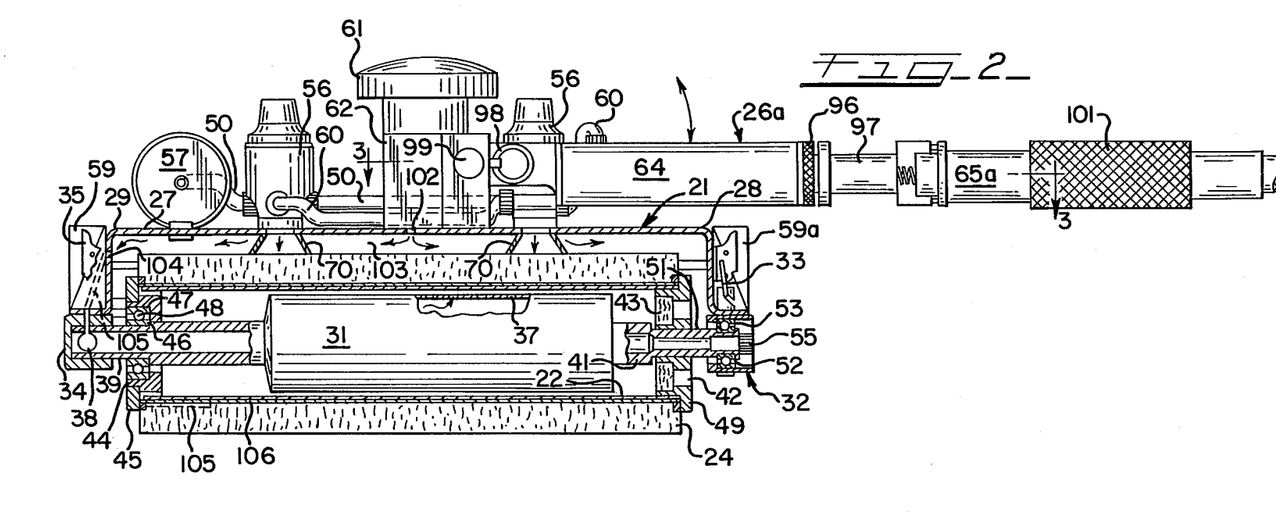
FIG. 2 is a partial sectional view generally through the longitudinal axis of one of the arbors of an embodiment wherein air motors are mounted within each arbor, the view also showing a liquid buffing compound distribution assembly mounted onto the device and supply air directed through a handle assembly and a cover manifold.
Figure 3:
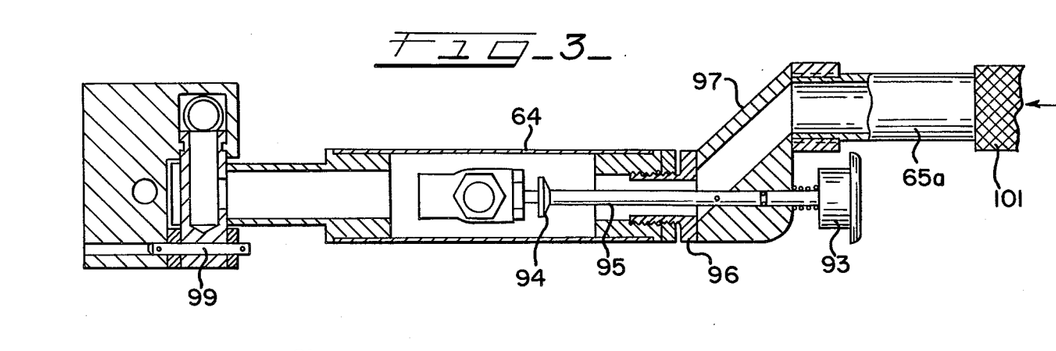
FIG. 3 is a top plan view, partially in section, of the handle assembly shown in FIG. 2.

Regarding the embodiment of FIGS. 2 and 3, each motor 31 is mounted within the elongated drive arbors 22, 23 respectively in a manner whereby the motors 31 are each securely mounted while the elongated drive arbors 22, 23 are rotatable along their respective longitudinal axes. Mounting of the motors 31 inside of the drive arbors 22, 23 provides simplified power transmission and reduces noise level.

Suitable mounting means are provided to affix the frame and cover assembly 21 to the motor 31. The particular mounting means illustrated in FIG. 2 includes a friction-reducing rotation assembly 32 secured to the depending legs 28 by overcenter clamps 33 and an end bar 34 that is mounted from depending leg 29 by overcenter clamps 35. When the overcenter clamps 33, 35 are released, the rotation assembly 32 and the end bar 34 separate from the frame and cover assembly 21 to thereby separate each motor 31 and both arbors 22, 23 mounted thereon from the frame and cover assembly 21. The friction reducing rotation assembly 32 can then be pulled off of a drive shaft extension 51 projecting from the motor 31 to thereby separate the drive arbors 22, 23 to facilitate changing of the polishing rolls or buff assemblies 24, 25, which are typically disposable.

When the motor 31 is an air motor, a supply of pressurized air enters through an inlet port 38, passing through an extension 39 of a stationary motor housing 36 and into the motor 31 which drives the rotating drive shaft 41. Exhaust ports 37 provide needed air flow out of the motor 31, and exhaust outlets 42, which may include muffling material 43, complete the air flow path through the device.

One end of the elongated drive arbor 22 is rotatably mounted onto the stationary motor housing 36 by a suitable low-friction rotation assembly 44. Each roll or buff assembly 24 is secured in place by a buffing roll lock nut 45. The rotation assembly 44 illustrated includes a stationary inner race 46, a rotating outer race 47, and bearings 48.

The other end of the elongated drive arbor 22 is mounted to the rotating drive shaft 41 by a rotating collar 49. The motor 31 rotates the drive shaft 41 to thereby rotate the collar 49 and thus the elongated drive arbor 22 and the polishing roll or buff assembly 24 mounted thereover. This rotational drive can be facilitated by providing flat surfaces on the drive shaft 41, such as the extension 51 having a generally square cross-section. The rotating drive shaft 41 is mounted to the frame assembly 21 by means of the rotation assembly 32 which includes a suitable friction-reducing structure, such as the illustrated rotating inner race 52, stationary outer race 53, and bearings 54. The rotation assembly 32 may be secured to the drive shaft 41 by a securement member such as bolt 55.

Motor 31 drives the polishing roll or buff assembly 24 in one rotational direction, for example clockwise, while a similar motor (not shown) drives the polishing roll or buff assembly 25 in the opposite rotational direction, for example counterclockwise, to thereby provide counter-rotating polishing rolls or buff assemblies 24 and 25. Such counter-rotation may be achieved by mounting the two motors in opposite orientations whereby the rotating drive shaft of the other motor is mounted into the end bar 34.

Frame and cover assembly 21 may include suitable spray assemblies 56 for facilitating the application of buffing compound to the polishing rollers or buff assemblies 24 and 25. These spray assemblies 56 are in liquid-passing communication through hosing 50 with supply chamber 57 for providing liquid buffing compound under pressure. Chamber 57 is affixed to the frame and cover assembly 21. A preferred supply chamber 57 is of known type wherein the buffing compound is contained within a bellows-type liner, and a pressurized gas is charged in the space between the liner and the inside walls of the supply chamber 57.

Spray assemblies 56 provide a location for atomizing the liquid buffing compound with pressurized air entering same by way of air conduit 60. Pressurized air enters air conduit 60 by depressing button 93 which opens a valve 94 within remote handle assembly 26a. The pressurized air passing through air conduit 60 enters the spray assemblies 56 and directly impinges upon liquid buffing compound entering the spray assemblies 56 through hosing 50 to thereby produce a generally fan-shaped spray through spray collars 70 and along the length of the polishing rolls or buff assemblies 24, 25.

Regarding the handle assembly 26a, extensions may be added to the handle shaft 64 by extending the length of a valve pin 95 and adding an extension shaft to the handle shaft 64, which is facilitated by a suitable interlock structure (not shown). A union 96, or the like, facilitates rotation of an offset handle element 97, by which rotation of the handle, member 65a may be generally centered with respect to the frame and cover assembly 21. A fastpin 98 holds the handle assembly 26a in the orientation shown in FIGS. 2 and 3, which is generally parallel to the axes of the polishing rolls or buff assemblies 24, 25. When the fastpin 98 is pulled outwardly, the handle assembly 26a is free to rotate along a pin 99 in a generally up-or-down direction.

A twist throttle 101 controls the flow of pressurized air through the handle assembly 26a. Such pressurized air flows through suitable passageways in the attachment member 62 and through an orifice 102 into manifold accumulator 103, which assists in maintaining equalized air pressure feed to both of the motors 31. Pressurized air within the manifold accumulator 103 flows through an orifice 104 in depending leg 29, transfer port 105 within manifold block 59, and into inlet port 38 of the end bar 34 in order to drive the motor 31. Similar passageways through the depending leg 28 and manifold block 59a provide drive air to the other counter-rotating motor.

Figure 4:
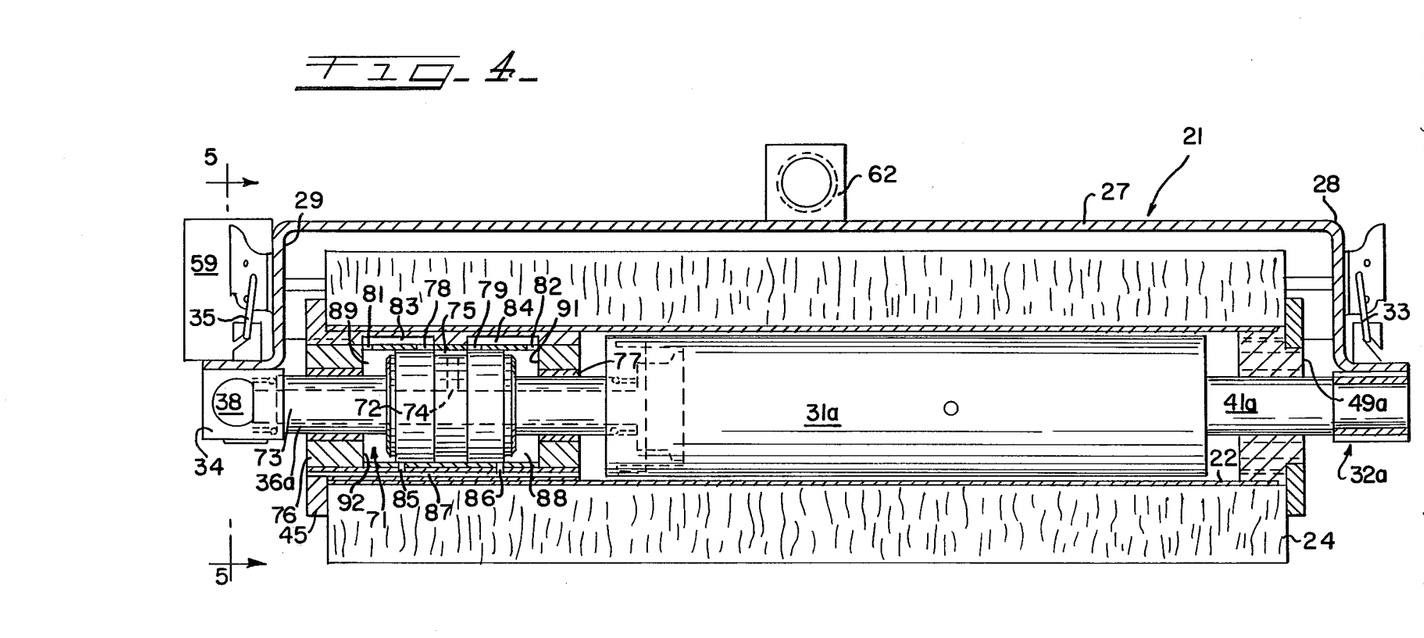
FIG. 4 is a longitudinal section through the axis of one of the arbors of another embodiment of the invention wherein the motor is mounted within the arbor and wherein each of the elongated buffers reciprocates along its axis while it rotates therealong.
Figure 5:
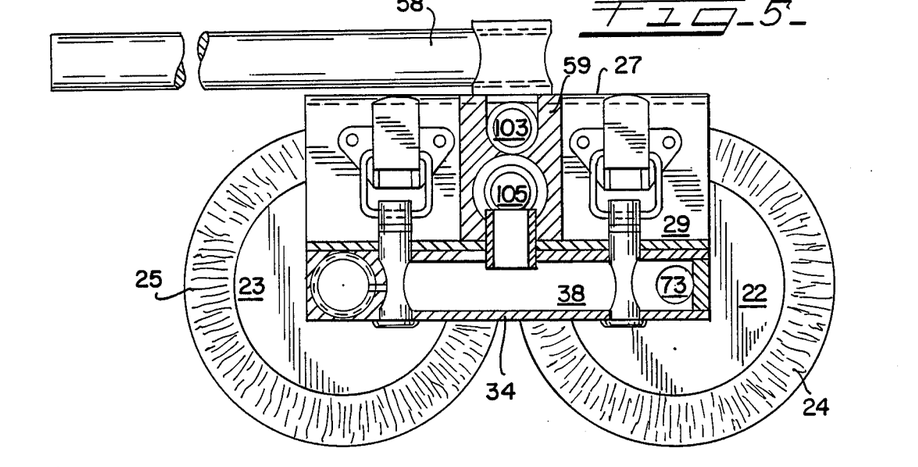
FIG. 5 is a sectional view along the line 5—5 of FIG. 4.

In the embodiment illustrated in FIGS. 4 and 5, the elongated drive arbors 22, 23 and the respective polishing rolls or buff assemblies 24, 25 secured thereto both reciprocate as well as rotate. Preferably, the polishing rolls or buff assemblies 24, 25 while they counter-rotate, simultaneously oscillate on their respective axes of rotation.

A reciprocating motor assembly including motor 31a is mounted at one end by its rotating drive shaft 41a, being secured to the depending leg 28 by a rotation mount 32a releasably secured to the depending leg 28 by a structure such as the overcenter clamp 33, or the like. The other end of the motor 31a is mounted to the depending leg 29 by the end bar 34 which securely holds stationary housing 36a in place onto the depending leg 29 by a suitable structure such as the overcenter clamp 35. A rotating and reciprocating collar 49a is slidably mounted onto the drive shaft 41a which includes flats or the like to ensure rotation of the elongated drive arbor 22 and its polishing roll or buff assembly 24 as the drive shaft 41a rotates.

The reciprocating motor assembly imparts reciprocating motion to the arbor 22 by a piston assembly 71 which includes a stationary piston 72 securely mounted over extending stationary motor housing 36a. Piston assembly 71 further includes a cylinder-like piston housing 76 that is rotatably and slidably mounted onto the extending stationary motor housing 36a and that is securely mounted to the drive arbor 22.

Pressurized air enters the device through inlet port 38 and into axial passageway 73 which includes a branch 74 opening into a peripheral supply groove 75. While pressurized air moves through the axial passageway 73 to drive the motor 31a, it also flows through branch 74 and into supply groove 75. The piston housing 76 includes a plurality of ports, a pair of which 78, 79 are interiorly located with respect to the stationary piston 72. Another pair of ports 81, 82 are exteriorly located with respect to the stationary piston 72. Piston housing 76 further includes an outside supply passage 83 connecting the internal port 78 with the external port 81, as well as an inside supply passage 84 for communicating the internal port 79 with the external port 82. The piston housing 76 further includes an outside exhaust port 85 and an inside exhaust port 86 which link interior chambers 88, 89 of the cylinder-like piston housing 76 with an exhaust passage 87.

During the operation of this device, with the motor 31a rotating the polishing roll or buff assembly 24, air is supplied into the peripheral supply groove 75, and the polishing roll or buff assembly 24 is moved linearly, for example to the left as illustrated in FIG. 4, whereby the supply groove 75 moves into general alignment with the internal port 79. It will be appreciated by those skilled in the art that this movement will be initiated either by the pressurized air when the supply groove 75 opens, even if only marginally, into one of the internal ports 78, 79 or by slight movement of the frame and cover assembly 21 with respect to the buff assembly 24. Thereupon, the pressurized air enters the inside supply passage 84 for movement through the external port 82 and into the interior chamber 88, at which time the pressurized air within this interior chamber 88 imparts a pressure to an interiorly facing wall 91 of the interior chamber 88 to thereby move the piston housing 76 to the right as illustrated in FIG. 4, which likewise moves the polishing roll or buff assembly 24 in this direction. Such movement also moves the inside exhaust port 86 to a position generally clear of the stationary piston 72 and into communication with the interior chamber 88, whereby pressurized air within the interior chamber 88 passes through the inside exhaust port 86 and out of the piston housing 76 by way of the exhaust passage 87.

At substantially the same time that this air passage through inside exhaust port 86 occurs, the supply groove 75 becomes generally aligned with the internal port 78 whereby pressurized air passes therethrough and into the interior chamber 89 by way of an outside supply passage 83 and the external port 81. This builds up air pressure within the interior chamber 89 at about the same time that the pressure is dissipated within the other interior chamber 88, with the result that the piston housing 76 and the polishing roll or buff assembly 24 move to the left as illustrated in FIG. 4, thereby opening the outside exhaust port 85 into the exhaust passage 87 to thereby dissipate the pressure within the interior chamber 89. Pressure within the interior chamber 89 impinges upon its externally facing wall 92 in order to effect the movement of the piston housing 76 to the left. As the air continues to flow through the branch 74, pressure continues to be alternately built up and dissipated within the inside interior chamber 88 and the outside interior chamber 89 in order to impart a reciprocating, or oscillating linear movement to the elongated drive arbor 22 and its polishing roll or buff assembly 24. Preferably, a similar, but oppositely oriented, arrangement is included within the elongated drive arbor 23, with the result that the polishing roll or buff assembly 25 reciprocates also.

Figures 6, 7:
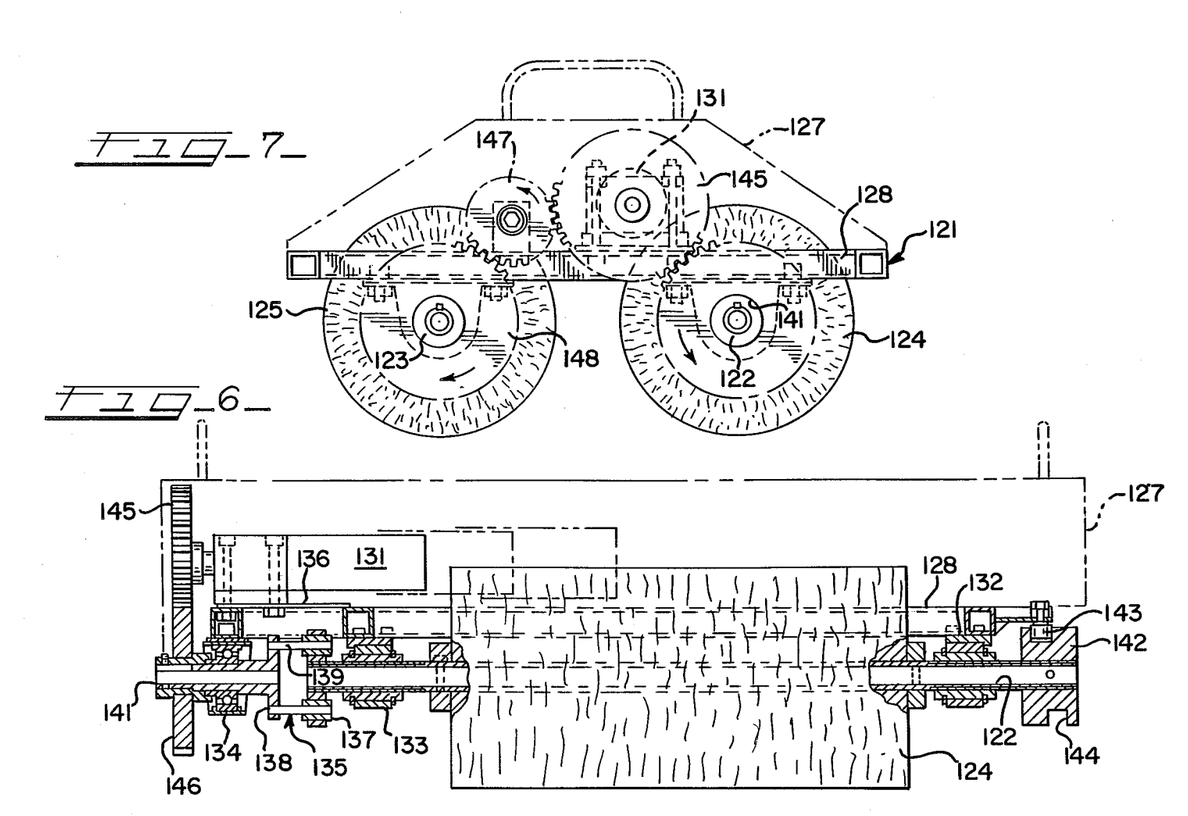
FIG. 6 is a side elevational view, partially in section, of an alternative embodiment having its drive motor mounted externally of the arbors.
FIG. 7 is an end elevational view of the embodiment illustrated in FIG. 6, showing a further handle assembly.
Figure 8:
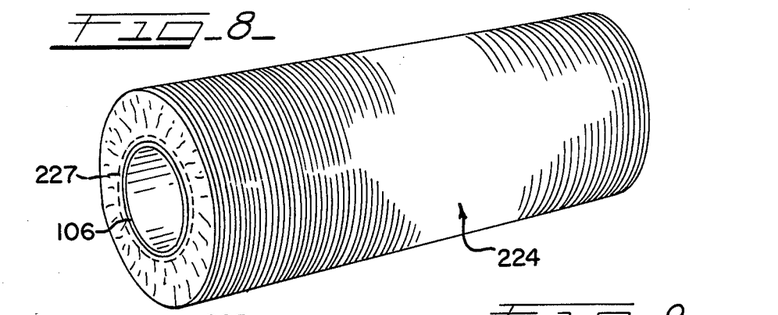
FIG. 8 is a perspective view of the compactly assembled buff according to this invention.

Regarding FIGS. 6 and 7, these illustrate an embodiment wherein a motor 131 is mounted externally of polishing rolls 124, 125, rather than within drive arbors 122, 123. The device includes a frame and cover assembly 121 which includes a frame 128 to which is mounted a protective cover 127, shown in phantom. Each elongated drive arbor 122, 123 is secured to the frame 128 by pillow blocks or rotation and reciprocation collars or assemblies 132 and 133. Motor 131 is attached to the frame assembly 121 by a suitable stationary motor housing 136.

This device effects counter-rotation of the polishing rolls or buff assemblies 124, 125. Collars or assemblies 132 and 133 allow rotary, and preferably also linear, movement of the elongated drive arbor 122 with respect to the frame assembly 121. In order to maintain alignment between the motor 131 and the assembly that drives the elongated drive arbor 122, a linear movement accommodating assembly or coupling 135 joins the elongated drive arbor 122 to a drive shaft 141 that is rotatably mounted to the stationary motor housing 136 by a pillow block or rotation assembly 134. Coupling 135 includes a linear bearing 137 mounted onto pins 138, 139. By this structure, the linear bearing 137 is able to move axially on the pins 138, 139 while there is no linear movement of the drive shaft 141.

When it is desired to effect counter-oscillation of the polishing rolls 124, 125, a cylindrical cam 142 is rigidly secured to each elongated drive arbor 122, 123, and a cam follower 143 is securely mounted to the frame 128. As the cam 142 rotates with the elongated drive arbor 122, the cam follower 143 moves through an eccentric slot 144 to thereby oscillate the elongated drive arbor 122 and the polishing roll or buff assembly 124 mounted thereon. A similar structure is included on the other elongated drive arbor 123 in order to impart axial, oscillating movement of the polishing roll 125. Counter-oscillation of the rolls or buff assemblies 124, 125 is achieved by orienting the eccentric slots 144 of the respective cams 142 generally opposite to each other such that cam 142 on drive arbor 122 is fully extended (to the right in FIG. 6) when the cam 142 on drive arbor 123 is fully retracted (to the left in FIG. 6), and vice versa.

Referring to the drive assembly illustrated in FIGS. 6 and 7, such includes a gear assembly. The gear assembly includes a drive gear 145 secured to the shaft of the motor 131 which directly drives a driven gear 146 in a direction opposite to that of the drive gear 145. The drive gear 145 simultaneously rotates an intermediate gear 147 which in turn drives another driven gear 148 in the same direction as the drive gear 145 in order to achieve counter-rotation of the drive arbors and their polishing rolls 124, 125. Drive assemblies other than the gear assembly illustrated in FIGS. 6 and 7 may be substituted, including gear chain arrangements and belt and sheave arrangements using one or more belts.

Regarding the polishing rolls or buff assemblies 24, 25, these are preferably predressed and disposable. Typically such polishing rolls 24, 25 consist of a plurality of rotary buffing wheels 105 (FIG. 2) that are assembled, such as by an adhesive, in end-to-end relationship with each other onto a disposable elongated cylinder 106. Then the plurality of adjacent wheels 105 are dressed as needed to provide a generally uniform polishing surface and complete the manufacture of the polishing rolls or buff assemblies 24, 25 for insertion over the elongated drive arbors 22, 23 by sliding the elongated cylinder 106 thereover.

Further details of the polishing rolls or buff assemblies are provided in FIGS. 8, 9, 10 and 11. Non-chamfered polishing rolls or buff assemblies are generally designated as 224, and chamfered polishing rolls or buff assemblies are generally designated as 224a. Buff assembly 224 includes the disposable elongated cylinder 106 and a plurality of compressed, adjacent buffing wheels 105. With more particular reference to the illustrated buffing wheels 105, each is composed of a plurality of fabric disks 225 having cellulosic spacer disks 226 therebetween. Preferably, the fabric disks 225 and the spacer disks 226 are joined together for convenience of assembly onto the elongated cylinder 106. Typical assembly means in this regard includes stitched thread 227.

Figure 9:
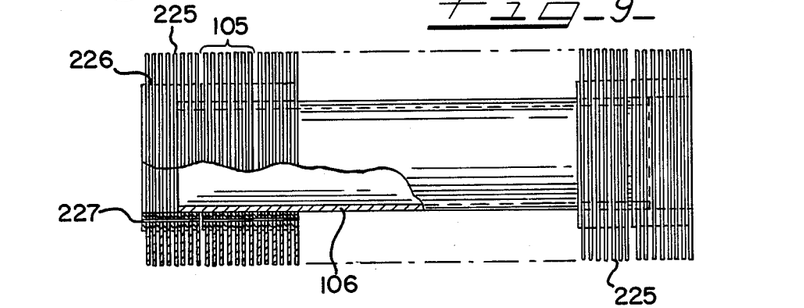
FIG. 9 is a side elevational view, partially in section, showing a step in the assembly of the preferred buff.

Buff assemblies 224, 224a are compressed structures which provide enhanced buffing capabilities and characteristics. As can be seen in FIG. 9, when the buffing wheels 105 are positioned adjacent one another but without compressing same, they provide a total linear length significantly greater than that of the compressed buff assembly 224 or 224a. The required compression is carried out by a suitable device such as an arbor press or the like (not shown). By such compression, each fabric disk 225 is compressed. Such compression is maintained by suitable means, preferably by appropriate placement of an adhesive or a glue that sets while the buffing wheels 105 are under compression in order to thereby affix the internal surfaces of the buffing wheels 105 to the outside surface of the disposable elongated cylinder 106.

The completed buff assembly 224, 224a will have a total length that is reduced as much as to 85 percent of the free length of the uncompacted buffing wheels 105, which is referred to herein as a compaction amount of 15 percent. The exact amount of compaction that is most advantageous for a particular buff assembly will of necessity vary somewhat depending upon the material and weave characteristics of the buffing wheels 105. Generally speaking, the advantageous results of this aspect of the invention require a compression amount of at least about 5 percent, preferably at least about 8 percent.

Figure 10:
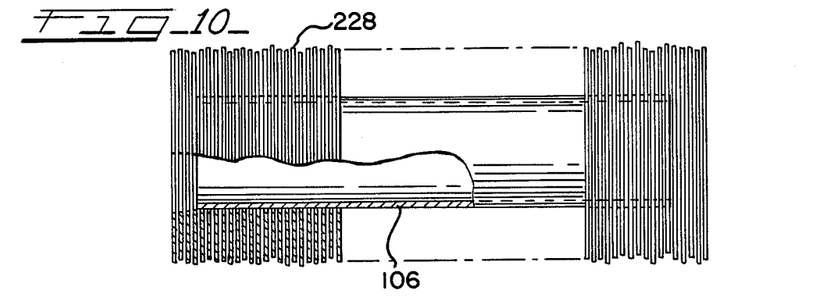
FIG. 10 is a side elevational view, partially in section, showing a step in the assembly of an alternative embodiment of the buff.

An alternative embodiment of this invention is illustrated in FIG. 10, wherein an extensive plurality of individual fabric disks 228 are not preassembled or presegmented into buffing wheels 105, but each such fabric disk 228 is directly assembled and bonded onto the disposable elongated cylinder 106. Such assembly is then followed by a compaction procedure as generally described herein when the segmented buffing wheels 105 are utilized.

Fabric disks 225, 228 are most advantageously made of a fiber that has microscopic-sized barbs and irregularly shaped portions, such as are exhibited by most natural fibers. Such barbs and irregularly shaped portions enhance the ability of the buff assemblies to hold polishing compound and to minimize the experience of scratching the surface being polished.

Figure 11:
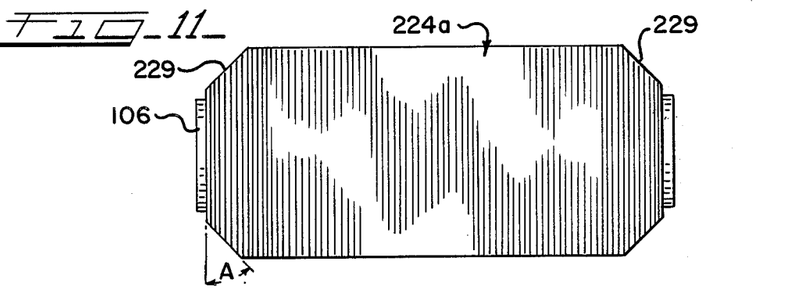
FIG. 11 is a side elevational view of a compactly assembled and chamfered buff according to this invention.

Especially advantageous results are achieved when circumferential end chamfers 229 are provided on the completed and dressed buff assemblies 224a as generally illustrated in FIG. 11. Typically, each end chamfer will be at a chamfer angle A, such angle A generally being on the order of between about 15° and 60°, and this angle will usually change when the buff assembly 224a is redressed.

This angle can, of course, be readily modified depending upon the needs of the user by rotating the buff assemblies 224a and contacting the chamfered area 229 with an abrasive or cutting surface at the desired angle. End chamfers 229 are particularly advantageous for minimizing the formation of so-called lap marks that tend to become evident during buffing, particularly when the buffing is being carried out to an especially highly polished condition. End chamfers 229 are also useful in minimizing the experience of in-use laying over of the fabric disks 225 or 228 that are near the ends of the buff assembly 224a. When especially effective buffing is needed, the combination of the compaction aspects of this invention with the end chamfers 229 provide an especially advantageous buff assembly 224a that provides a highly polished finish in a relatively short length of time. Usually, such a structure will also reduce the frequency and extent of in-use dressing of the buff assemblies. In this regard, the dressing and chamfering of the buff assembly 224a is facilitated by the axial compression aspect of this invention.

The following Examples illustrate the advantages that are achieved by the axially compressed buff assemblies according to his invention.

EXAMPLE I

A plurality of four feet by eight feet sheets of Alclad (trademark of Aluminum Company of America) aluminum sheeting suitable for manufacturing aircraft bodies were polished by two basically different procedures. One procedure included industrial-scale polishing at a polishing mill. The other procedure included polishing by means of the portable polisher according to this invention that was fitted with the axially compacted buff assemblies according to this invention. Four different samples were subjected to reflectivity testing such that a light source was directed toward the polished sheet at an incidence angle of 45°, and the light reflected at 45° was recorded with a Spotmeter. The resultant measurement data were related to measurements taken from a calibrated mirror. The readings from these two measurements were then ratioed (aluminum:mirror) to thereby yield a reflectivity percentage for the aluminum sheet. Two of the aluminum sheets had been polished with the axially compressed buff according to this invention, and they provided reflectivity percentages of 60.2 percent and 65.3 percent, respectively. The two samples that were polished at the mill exhibited reflectivity percentages of 58.1 percent and 62.9 percent, respectively.

EXAMPLE II

Portable polishing devices according to this invention were used to polish a plurality of four feet by eight feet sheets of Alclad aluminum sheet. Such portable polishing devices were fitted with a variety of buff assemblies made from a plurality of cotton buffing wheels with cellulosic spacer disks, which segmented assemblies were mounted onto and secured to a spirally wrapped paperboard tube with a baked water-resistant coating thereover. Some of the buffs were uncompressed (or exhibited zero compression), such being made by hand assembling and gluing the segmented buffing wheels over the paperboard tube. It was extremely difficult to achieve mill-grade reflectivity when using such uncompressed buff assemblies. It took from about 60 minutes to about 80 minutes to obtain good quality reflectivity with these uncompressed buff assemblies, such good quality reflectivity being noticeably less than that of a mill polished sheet.

Extremely high quality reflectivity on the order of that achieved by mill polishing was obtained by polishing for from about 25 minutes to about 30 minutes with buffing assemblies that were axially compressed about 12 percent. Good quality reflectivity on the order of that obtained by using the uncompressed buff assemblies for from about 60 to about 80 minutes was attained after only about 30 minutes to about 35 minutes with buffing assemblies that had been axially compressed by about 10 percent. Commercially adequate polishing quality suitable for maintenance or repair work on an existing airplane body was obtained during a period of from about 10 miutes to about 15 minutes when using buffing assemblies compressed by about 10 percent.

Figures 12, 13, 14:
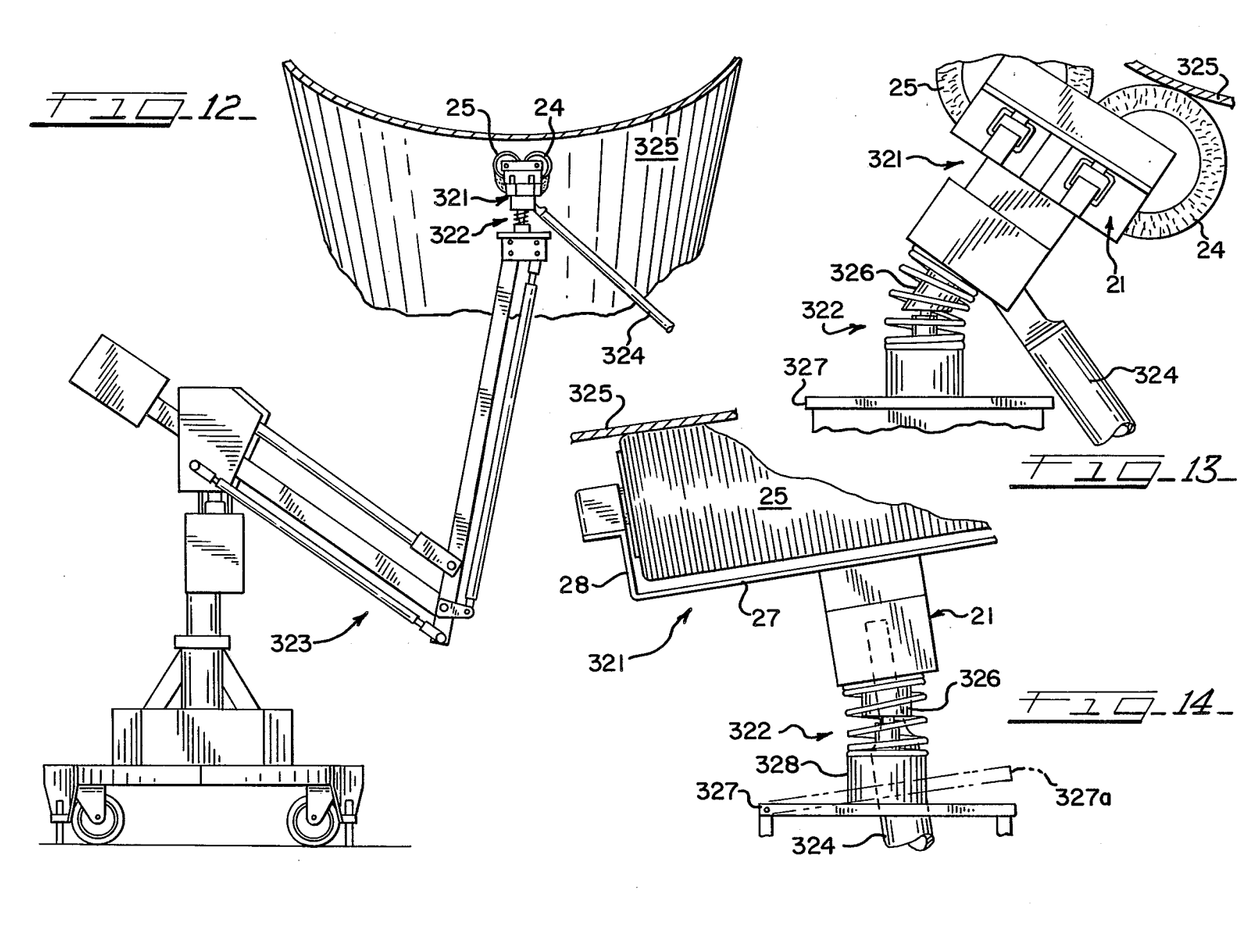
FIG. 12 is an elevational view of the combination according to this invention including a power-assisted lift structure.
FIG. 13 is a detailed elevational view showing a universal mount suitable for the FIG. 12 embodiment.
FIG. 14 is a detailed elevational view similar to FIG. 13 showing the mount in a different orientation.

FIGS. 12, 13 and 14 illustrate the combination according to this invention that includes the portable polisher 321, a universal mount assembly generally designated 322 and a power-assisted lift assembly generally shown at 323. The portable polisher 321 is generally as described elsewhere herein including the frame and cover assembly 21, counter-rotating elongated polishing rolls or buff assemblies 24, 25 and a pivotally mounted handle assembly 34. Preferably, air motors are utilized, and the pressurized air supply passes through the handle assembly 324 while the user manipulates the polisher 321 by moving the handle assembly 324 in order to guide the buff assemblies 24, 25 along the surface 325 being polished, such as the undersides of an aircraft fuselage.

With more particular reference to the power-assisted lift assembly 323, same may be a commercially available device such as the Balancemaster lifter of Conco Tellus, Inc. Such devices, which relieve the user of the need to hold an object at a raised orientation, include a combination of fluid relays and cylinders that urge the device to maintain the polisher 321 at a predetermined general height and to readily modify that height when desired. They may also be adjusted to provide a pressure contact between the buff assemblies 24, 25 and the surface 325.

Universal mount assembly 322 may take on any structural configuration on the order of a knuckle or joint that permits angular movement from vertical through a full circle. The illustrated universal mount assembly 322 includes a resilient mounting member 326 secured at one end to the frame and cover assembly 21 of the polisher 321 and at the other end onto a mounting plate 327 which may include pedestal 328. Resilient mounting member 326 is bendably supported by a generally coaxial spring 329 such that the resilient mounting member 326 and the spring 329 allow angular movement from vertical through a full circle as generally shown in FIGS. 13 and 14 in order to maintain the buff assemblies 24, 25 generally parallel to the curved configuration of the surface 325. If the surface 325 is part of a somewhat cylindrical surface such as the fuselage of an aircraft, the polisher will have to be manipulatable to polish to a generally vertical location. Continued use of this combination is facilitated by including a pivotable mounting plate 327a shown in phantom in FIG. 14.

It will be understood that the embodiments of the present invention which have been described are merely illustrative of a few of the applications of the principals of the present invention. Numerous modifications may be made by those skilled in the art without departing from the true spirit and scope of the invention.

What is claimed is:

1. A polishing roll buff assembly for a polishing apparatus including an elongated drive arbor depending from and rotatably mounted with respect to a frame assembly, said elongated drive arbor having a peripheral surface and an elongated longitudinal axis, said elongated longitudinal axis being generally parallel to the surface of the substrate being prepared by the apparatus, the improvement comprising said polishing roll buff assembly including:
   an elongated, disposable cylinder having an internal diameter greater than the external diameter of said elongated, cylindrically shaped driven arbor of the polishing apparatus;
   a plurality of fabric disks assembled onto and generally along the length of said elongated, disposable cylinder;
   said plurality of fabric disks are positioned adjacent to each other and are axially compressed together, said disks having been affixed to said elongated, disposable cylinder while said disks had been so axially compressed to form an axially compacted buff assembly; and
   said axially compacted buff assembly has an axial compression of at least about 5 percent and up to about 15 percent of the total length of the fabric disks when uncompacted.

2. The polishing roll buff assembly according to claim 1, further including a plurality of cellulosic spacer disks generally alternatingly assembled with said plurality of fabric disks onto said elongated, disposable cylinder, each said spacer disk having an outer diameter less than the outer diameter of the fabric disks.

3. The polishing roll buff assembly according to claim 1, wherein said affixed fabric disks are affixed by an adhesive material.

4. The polishing roll buff assembly according to claim 1, wherein said axial compression is between about 8 and about 15 percent of the total length of the fabric disks when uncompacted.

5. The polishing roll buff assembly according to claim 1, further including circumferential chamfers at each axial end of the compacted buff assembly.

6. The polishing roll buff assembly according to claim 1, wherein said axially compacted buff assembly has been predressed to modify the surface characteristics thereof.

7. The portable polishing apparatus according to claim 1, further including circumferential chambers at each axial end of the compacted buff assembly.

8. A portable polishing apparatus for surface preparation of substrates comprising:
   a frame assembly having handle means mounted thereonto for grasping and controlling the apparatus;
   two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;
   an elongated disposable polishing roll buff assembly securely mounted over the peripheral surface of each of said elongated drive arbors;

motor means for imparting rotational movement to each said buff assembly, said motor means being in operative interengagement with each of said elongated drive arbors;

drive means operatively engaging said motor means and said elongated drive arbors for transmitting rotational movement from said motor means to one of the elongated drive arbors and its polishing roll in a clockwise direction and to the other of said elongated drive arbors and its polishing roll in a counterclockwise direction, whereby said polishing rolls counter-rotate with respect to each other; and said elongated polishing roll includes an elongated, disposable cylinder having an internal diameter greater than the external diameter of the drive arbors, and a plurality of fabric disks assembled onto said elongated, disposable cylinder, said plurality of fabric disks being positioned adjacent to each other and axially compressed together to form an axially compacted buff assembly.

9. The portable polishing apparatus according to claim 8, further including a plurality of cellulosic spacer disks generally alternatingly assembled with said plurality of fabric disks onto said elongated, disposable cylinder, each said spacer disk having an outer diameter less than the outer diameter of the fabric disks.

10. The portable polishing apparatus according to claim 8, wherein said plurality of fabric disks are adhesively affixed to said elongated, disposable cylinder.

11. The portable polishing apparatus according to claim 8, wherein said axial compression is between about 5 and about 15 percent of the total length of the fabric disks when uncompacted.

12. The portable polishing apparatus according to claim 8, wherein said motor means includes a motor mounted within said rotatably mounted elongated drive arbor.

13. The portable polishing apparatus according to claim 8, wherein said drive means is rotatably mounted to said frame assembly generally along each said longitudinal axis of the respective elongated drive arbors.

14. The portable polishing apparatus according to claim 8, wherein said motor means is an air-driven motor.

15. The portable polishing apparatus according to claim 8, further including a buffing compound applicator assembly for applying buffing compound to said elongated polishing roll buff assemblies, said applicator assembly including a supply chamber mounted onto said frame assembly, a spray assembly having a spray orientation toward said elongated polishing roll buff assemblies, a conduit member joining the supply chamber to the spray assembly, and means for supplying pressurized air to said spray assembly to thereby atomize buffing compound entering said spray assembly from said supply chamber.

16. The portable polishing apparatus according to claim 8, wherein said handle means includes an elongated handle shaft having means for regulating power input to said motor means, said elongated handle shaft being rotatably mounted onto said frame assembly.

17. The portable polishing apparatus according to claim 8, wherein said handle means includes an elongated handle shaft that is rotatably mounted to said frame assembly by mounting means for providing alternative positioning of the handle shaft along a first axis that is generally transverse to said axes of the elongated polishing roll buff assemblies and along a second axis that is generally transverse to its said first axis.

18. The portable polishing apparatus according to claim 8, wherein said motor is an air motor mounted within said rotatably mounted elongated drive motor arbor and said drive means includes passageways having pressurized air flowing therethrough, said passageways including an accumulator manifold upstream of said motor means.

19. The portable polishing apparatus according to claim 8, wherein said drive means is also for imparting generally linear, reciprocating movement to each said elongated drive arbors.

20. The portable polishing apparatus according to claim 19, wherein said drive means for imparting generally linear, reciprocating movement includes a piston assembly stationarily mounted onto a housing of the motor means and further includes a cylinder-like piston housing rotatably and slidably mounted onto said motor housing and stationarily mounted to said elongated drive arbor.

21. The portable polishing apparatus according to claim 20, wherein said rotatable and slidable piston housing includes a plurality of passageways for directing pressurized air alternately to one interior chamber of the piston housing on one side of the stationary piston assembly and then to another interior chamber of the piston housing on an opposite side of the stationary piston assembly.

22. The portable polishing apparatus according to claim 19, wherein said drive means for imparting generally linear, reciprocating movement includes a coupling member operatively engaging the elongated drive arbor to a drive shaft that is driven by said motor means in a linearly stationary manner, said coupling member including extension members for accommodating linear movement of said elongated drive arbor.

23. A portable polishing apparatus for surface preparation of substrates comprising:

a frame assembly having a universal mount assembly mounted thereonto for grasping and controlling the apparatus, said universal mount assembly including means for permitting angular movement from a vertical orientation through a full circle, said vertical orientation being generally perpendicular to the major dimension of the apparatus;

two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;

an elongated disposable polishing roll buff assembly securely mounted over the peripheral surface of each of said elongated drive arbors;

motor means for imparting rotational movement to each said buff assembly, said motor means being in operative interengagement with each of said elongated drive arbors; and drive means operatively engaging said motor means and said elongated drive arbors for transmitting rotational movement from said motor means to one of the elongated drive arbors and its polishing roll in a clockwise direction and to the other of said elongated drive arbors and its polishing roll in a counterclockwise direction, whereby said polishing rolls counter-rotate with respect to each other.

24. The portable polishing apparatus of claim 23, wherein said elongated polishing roll includes an elongated, disposable cylinder having an internal diameter greater than the external diameter of the drive arbors, and a plurality of fabric disks assembled onto said elongated, disposable cylinder, said plurality of fabric disks being positioned adjacent to each other and axially compressed together to form an axially compacted buff assembly.

25. The portable polishing apparatus of claim 24, further including a plurality of cellulosic spacer disks generally alternatingly assembled with said plurality of fabric disks onto said elongated, disposable cylinder, each said spacer disk having an outer diameter less than the outer diameter of the fabric disks.

26. The portable polishing apparatus of claim 24, further including circumferential chamfers at each axial end of the compacted buff assembly.

27. The portable polishing apparatus of claim 23, wherein said motor means includes a motor mounted within said rotatably mounted elongated drive arbor.

28. The portable polishing apparatus of claim 23, further including a power-assisted lift assembly, and wherein said universal mount assembly is mounted to the lift assembly and is positioned between said frame assembly and said lift assembly.

29. The portable polishing apparatus of claim 28, wherein said power-assisted lift assembly includes means for generally maintaining the elongated disposable polishing buff assemblies at a selected raised orientation.

30. The portable polishing apparatus of claim 28, wherein said universal mount assembly includes a pivotable mounting member that is in operative interengagement with said power-assisted lift assembly.

* * * * *

UNITED STATES PATENT AND TRADEMARK OFFICE
CERTIFICATE OF CORRECTION

PATENT NO. : 4,570,278
DATED : February 18, 1986
INVENTOR(S) : Bloome et al

It is certified that error appears in the above—identified patent and that said Letters Patent are hereby corrected as shown below:

Column 11, line 27, "assembly 34." should read --assembly 324.--.
Column 12, line 52, "chambers" should read --chamfers--.

Signed and Sealed this

Nineteenth Day of August 1986

[SEAL]

Attest:

Attesting Officer

DONALD J. QUIGG

Commissioner of Patents and Trademarks